United States Patent
Su et al.

(10) Patent No.: US 9,426,767 B2
(45) Date of Patent: Aug. 23, 2016

(54) METHOD, GATEWAY, PROXY AND SYSTEM FOR IMPLEMENTING MOBILE INTERNET SERVICES

(75) Inventors: Yong Su, Shenzhen (CN); Dong Huang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 297 days.

(21) Appl. No.: 13/884,379

(22) PCT Filed: Jan. 19, 2011

(86) PCT No.: PCT/CN2011/070402
§ 371 (c)(1),
(2), (4) Date: May 9, 2013

(87) PCT Pub. No.: WO2012/062049
PCT Pub. Date: May 18, 2012

(65) Prior Publication Data
US 2013/0265940 A1    Oct. 10, 2013

(30) Foreign Application Priority Data
Nov. 9, 2010  (CN) .......................... 2010 1 0538248

(51) Int. Cl.
*H04W 60/00* (2009.01)
*H04L 29/08* (2006.01)
*H04L 12/707* (2013.01)

(52) U.S. Cl.
CPC ......... *H04W 60/00* (2013.01); *H04L 29/08846* (2013.01); *H04L 67/04* (2013.01);
(Continued)

(58) Field of Classification Search
None
See application file for complete search history.

(56) References Cited

U.S. PATENT DOCUMENTS

| 7,483,373 B2 * | 1/2009 | Willey et al. ................ 370/231 |
| 2002/0013852 A1 * | 1/2002 | Janik ............................ 709/231 |

(Continued)

FOREIGN PATENT DOCUMENTS

| CN | 101106812 A | 1/2008 |
| CN | 101110840 A | 1/2008 |

(Continued)

OTHER PUBLICATIONS

Mukheqee et al (Networking Research Center, Bell Laboratories), "Always on: A New Paradigm for Wireless Networks", 2004, IEEE, 0-7803-8523-3/04, pp. 226-233 vol. 1.*

(Continued)

*Primary Examiner* — Jenee Williams
(74) *Attorney, Agent, or Firm* — Oppedahl Patent Law Firm LLC (57) ABSTRACT

A method, gateway, proxy and system for implementing mobile Internet services are provided, in which an AOG receives a first register request from a terminal application proxy, and establishes a first data link with the terminal application proxy according to the first register request; receives a second register request from at least one application server and establishes a second data link with the at least one application server according to the second register request; performs application data forwarding between at least one application client in a terminal and the at least one application server through the terminal application proxy, the first and second data links. Arrangement of an AOI system between a terminal application proxy and an AOG converges a large number of data links in the present mobile Internet, lowers the network load, reduces network resource consuming of mobile Internet applications and improves the utilization performance of mobile Internet.

14 Claims, 6 Drawing Sheets

(52) U.S. Cl.
CPC ........ *H04L67/2814* (2013.01); *H04L 67/2861* (2013.01); *H04L 67/327* (2013.01); *H04L 45/24* (2013.01); *H04L 67/2804* (2013.01)

(56) References Cited

U.S. PATENT DOCUMENTS

| | | | |
|---|---|---|---|
| 2003/0123423 A1* | 7/2003 | Okanoue | 370/338 |
| 2004/0215785 A1* | 10/2004 | Shima | 709/227 |
| 2005/0041578 A1* | 2/2005 | Huotari et al. | 370/229 |
| 2005/0165944 A1* | 7/2005 | Xue et al. | 709/232 |
| 2005/0210101 A1* | 9/2005 | Janik | 709/203 |
| 2005/0228848 A1 | 10/2005 | Thurston et al. | |
| 2007/0081547 A1* | 4/2007 | Munje | 370/437 |
| 2007/0086433 A1* | 4/2007 | Cunetto et al. | 370/352 |
| 2007/0140157 A1* | 6/2007 | Fu et al. | 370/318 |
| 2007/0233849 A1* | 10/2007 | Chandranmenon et al. | 709/224 |
| 2008/0059582 A1* | 3/2008 | Hartikainen et al. | 709/204 |
| 2008/0212763 A1* | 9/2008 | Chandranmenon et al. | 379/211.01 |
| 2009/0029697 A1* | 1/2009 | Bianconi et al. | 455/432.3 |
| 2009/0178128 A1* | 7/2009 | Chiba et al. | 726/7 |
| 2010/0071053 A1* | 3/2010 | Ansari et al. | 726/12 |
| 2011/0060902 A1* | 3/2011 | Nagata | 713/155 |
| 2011/0153457 A1* | 6/2011 | Hinks | 705/26.81 |
| 2012/0063402 A1* | 3/2012 | Arvidsson et al. | 370/329 |
| 2012/0110210 A1* | 5/2012 | Huang et al. | 709/246 |
| 2012/0147839 A1* | 6/2012 | Yin et al. | 370/329 |

FOREIGN PATENT DOCUMENTS

| | | |
|---|---|---|
| CN | 101622853 A | 1/2010 |
| CN | 101674244 A | 3/2010 |
| EP | 1853044 A1 | 11/2007 |
| JP | 2004528764 A | 9/2004 |
| JP | 2005157639 A | 6/2005 |
| JP | 2006033541 A | 2/2006 |
| JP | 2008011536 A | 1/2008 |
| JP | 2008526097 A | 7/2008 |
| JP | 2009048510 A | 3/2009 |
| JP | 2012513625 A | 6/2012 |
| KR | 2010029092 A | 3/2010 |
| WO | 2007136101 A1 | 11/2007 |
| WO | 2010072238 A1 | 7/2010 |

OTHER PUBLICATIONS

Park et al, "Energy Efficient Multi-Function Home Gateway in Always-On Home Environment", Oct. 2010, IEEE Transactions on Consumer Electronics, vol. 56, No. 1, pp. 106-111.*

Anonymous: "Network Service Access Point Identifier—Wikipedia, the free encyclopedia", Wikipedia, the free encyclopaedia, Sep. 24, 2010, Retrieved from the Internet: URL: http://en.wikipedia.org/w/index.php?title=Network_Service_Access_Point_Identifier &oldid=386836839 [retrieved on Apr. 7, 2014]. (2 pages—see Supplementary European Search Report in European application No. 11840588.5 for relevant pages).

Supplementary European Search Report in European application No. 11840588.5, mailed on Apr. 22, 2014. (9 pages—see entire document).

International Search Report in international application No. PCT/CN2011/070402, mailed on Aug. 18, 2011. (2 pages—see entire document).

English Translation of the Written Opinion of the International Search Authority in international application No. PCT/CN2011/070402, mailed on Aug. 18, 2011. (3 pages—see entire document).

Caporuscio M et al: "Design and evaluation of a support service for mobile, wireless publish/subscribe applications", IEEE Transactions on Software Engineering, IEEESERVICE Center, Los Alamitos, CA, US, vol. 29, No. 12, Dec. 1, 2003, pp. 1059-1071, XP011107054, ISSN: 0098-5589,001: 10.1109/TSE.2003.1265521, mailed on Dec. 1, 2003.

* cited by examiner

Fig. 8

METHOD, GATEWAY, PROXY AND SYSTEM FOR IMPLEMENTING MOBILE INTERNET SERVICES

TECHNICAL FIELD

The disclosure relates to the mobile Internet technology, and more particularly to a method, gateway, proxy and system for implementing mobile Internet services.

BACKGROUND

At present, as a kind of emerging network services, mobile Internet services which combine advantages of mobile networks and the Internet can provide various kinds of services including voice services, data services, image services and multimedia services etc. to users through smart phones which constitute an important part in mobile Internet services. Application client programs having specific functions can be run on smart phones and interact with application servers through smart phones to provide personalized, content-correlated and interactive application experience to users. With the increasing popularity of smart phones, more and more users have gotten used to implementing common services in their daily lives and daily work through mobile phone terminals, e.g. chatting, or transmitting and receiving mails through mobile phones, etc.

However, the following problems are exposed gradually with the explosion of mobile Internet services in smart phones:

since a long connection to an application server needs to be established for each application on a smart phone when an existing mobile Internet service is implemented, and n long connections will be established to application servers if n applications are run on a smart phone. The large number of smart phones will result in a large number of long connections in the mobile Internet if multiple connections are established in each smart phone, which greatly influences the network performance of the mobile Internet. In addition, a link detection packet will be initiated periodically on each long connection to perform detection, which results in a large number of detection packets in a network. These additional signaling loads brings about a great deal of additional wireless channel distribution and establishment performed by the mobile Internet, thus resulting in problems of call drop, access failures and network congestion, etc.

In addition, due to the huge amount of application data, most of which are uncompressed, of smart phones compared with traditional mobile phones, a large amount of data traffic is generated to have a great impact on the bandwidth of the whole mobile Internet. When a bottleneck is encountered to the bandwidth of the mobile Internet, various mobile Internet applications cannot be treated differently and some real-time and high-priority applications cannot be treated preferentially. When an application server needs to push a data message to a smart phone application client actively, it usually fails because the smart phone application client is offline, which influences use of mobile Internet services.

Meanwhile, for a service provider of an application, since each terminal which uses the application needs to establish a long connection with an application server, an extremely large number of long connections need to be established by the application server in the case that there is a large number of terminals. Because the number of connections established by each application server is limited, the application provider has to implement the function by using many application servers, which increases the establishment difficulty of the application provider.

Therefore, since in the mobile Internet of the prior art, application servers perform data interaction with terminal application clients via end-to-end connections, the number of connections is growing at an exponential speed with the increase of the number of terminals and applications, which not only increases consuming of network resources by mobile Internet applications, but also brings about a great impact on the mobile Internet and greatly influences the network performance of the mobile Internet, thereby further increasing the establishment difficulty of application providers.

SUMMARY

In view of the above, the disclosure provides a method, gateway, proxy and system for implementing mobile Internet services, in order to save network resources and improve network utilization performance.

The technical solution of the disclosure is implemented by the following way.

A method for implementing mobile Internet services includes receiving, by an Always Online Gateway (AOG), a first register request transmitted by a terminal application proxy, and establishing, by the AOG, a first data link with the terminal application proxy according to the first register request, wherein the terminal application proxy is configured to perform application data forwarding between at least one application client in a terminal and the AOG; receiving, by the AOG, a second register request transmitted by at least one application server, and establishing, by the AOG, a second data link with the at least one application server according to the second register request; and performing, by the AOG, application data forwarding between at least one application client in the terminal and the at least one application server, through the terminal application proxy, the first data link and the second data link.

The performing, by the AOG, application data forwarding between at least one application client in the terminal and the at least one application server, through the terminal application proxy, the first data link and the second data link may include receiving, by the AOG, a first application data packet of at least one application client in the terminal through the first data link, wherein the first application data packet is forwarded by the terminal application proxy, and the first application data packet is encapsulated under an Always Online Protocol (AOP), and contains an International Mobile Subscriber Identity (IMSI) number of the terminal and an application Identity (ID) number; and forwarding the first application data packet to a corresponding application server through the second data link according to the ID number.

The performing, by the AOG, application data forwarding between at least one application client in the terminal and the at least one application server, through the terminal application proxy, the first data link and the second data link may include receiving, by the AOG, a second application data packet transmitted by the at least one application server through the second data link, wherein the second application data packet is encapsulated under the AOP and contains a terminal number and an application ID number; and forwarding the second application data packet through the first data link according to the terminal number, to the terminal application proxy, which forwards the second application data packet to a corresponding application client according to the ID number.

The method may further include before forwarding the second application data packet through the first data link according to the terminal number, to the terminal application proxy, transmitting, by the AOG, a wakeup message to the terminal application proxy, which establishes the first data link with the AOG according to the wakeup message.

the forwarding the application data by the AOG may include forwarding, by the AOG, the application data according to a priority of the application data.

A method for implementing mobile Internet services includes registering, by a terminal application proxy, at least one application client in a terminal; obtaining an Internet Protocol (IP) address of an Always Online Gateway (AOG), to which a terminal user belongs, from an AOG Domain Name System (DNS); transmitting a first register request containing the IP address to the AOG, which establishes a first data link with the terminal application proxy according to the first register request; and performing, through the first data link, application data forwarding between at least one application client in the terminal and the AOG, which forwards the application data to the corresponding application server through a second data link established between the AOG and a corresponding application server.

A gateway for mobile Internet services includes a data link establishing module, configured to receive a first register request transmitted by a terminal application proxy and establish a first data link with the terminal application proxy according to the first register request, wherein the terminal application proxy is configured to perform application data forwarding between at least one application client in a terminal and the gateway; and to receive a second register request transmitted by at least one application server and establish a second data link with the at least one application server according to the second register request; and an application data transfer module, configured to perform application data forwarding between the at least one application client in the terminal and the at least one application server through the terminal application proxy, the first data link and the second data link.

The application data transfer module may include an application data receiving unit, configured to receive a first application data packet of at least one application client in the terminal through the first data link, wherein the first application data packet is forwarded by the terminal application proxy, and the first application data packet is encapsulated under an Always Online Protocol (AOP), and contains an International Mobile Subscriber Identity (IMSI) number of the terminal and an application Identity (ID) number; and an application data forwarding unit, configured to forward the first application data packet to a corresponding application server through the second data link according to the ID number.

The application data receiving unit may further be configured to, through the second data link, receive a second application data packet transmitted by the at least one application server, the second application data packet is encapsulated under the AOP and contains a terminal number and an application ID number.

The application data forwarding unit may further be configured to forward the second application data packet through the first data link according to the terminal number, to the terminal application proxy, which forwards the second application data packet to a corresponding application client according to the ID number.

The application data transfer module may further include a wakeup unit, configured, before the application data forwarding unit forwards the second application data packet to the terminal application proxy through the first data link according to the terminal number, to transmit a wakeup message to the terminal application proxy, which establishes the first data link with the gateway according to the wakeup message.

A terminal application proxy of mobile Internet services include an application client register unit, configured to register at least one application client in a terminal; an address information obtaining unit, configured to obtain an IP address of an AOG, to which a terminal user belongs, from an AOG DNS; a register request transmitting unit, configured to transmit a first register request containing the IP address to the AOG, which establishes a first data link with the terminal application proxy according to the first register request; and a data forwarding unit, configured to perform, through the first data link, application data forwarding between at least one application client in the terminal and the AOG, which forwards the application data to the corresponding application server through a second data link established between the AOG and a corresponding application server.

A system for mobile Internet services includes a terminal application proxy and an Always Online Gateway (AOG), wherein the terminal application proxy is configured to register at least one application client in a terminal and to transmit a first register request to the AOG, and wherein the AOG is configured to receive the first register request transmitted by the terminal application proxy and establish a first data link with the terminal application proxy according to the first register request; to receive a second register request transmitted by at least one application server and establish a second data link with the at least one application server according to the second register request; and to perform application data forwarding between the at least one application client in the terminal and the at least one application server through the terminal application proxy, the first data link and the second data link.

The system may further include an AOG Domain Name System (DNS), configured to provide an Internet Protocol (IP) address of an AOG, to which a terminal user belongs, to the terminal application proxy.

The disclosure provides a method, gateway, proxy and system for implementing mobile Internet services. By arranging an Always Online Infrastructure (AOI) system between a terminal and an AOG, a data link between the AOG and a terminal application proxy and a data link between the AOG and an application server are established, respectively. The AOG performs application data forwarding between each application client in the terminal and the application server through the established data links. Compared with the prior art, the disclosure has the following advantages:

1. a unified data transfer channel is provided for all application clients in a terminal and an application server to converge a large number of data links existing in the present mobile Internet, reduce a large number of link detection packets therein, lower the network load, reduce the consuming of network resources by the mobile Internet applications, and improve the utilization performance of mobile Internet;

2. for an application service provider, the number of connections which need to be established by the application service provider and a terminal is reduced, and the establishment costs and difficulty of the application service provider are reduced;

3. Access management and optimization control of application data are further provided and an application with a higher priority can be treated preferentially;

4. A data compression function is further provided to reduce the amount of data transmitted by an application and lower the network load;

5. A wakeup function of a terminal application client is provided so that the terminal application client is not started in normal times, and a terminal application program is started to perform data interaction with a server when communication needs to be performed with an application server, thus lowering the daily battery consumption of the terminal and providing a long-time online method for the application client.

DETAILED DESCRIPTION

The major solution provided by the embodiments of the disclosure is that: a data link between an AOG and all application clients in a terminal, and a data link between the AOG and application servers are established, respectively, and the AOG performs application data transfer between each application client in the terminal and the application server through the established data links, so as to provide a unified data transfer channel for all the application clients in the terminal and the application servers and reduce the consuming of network resources by the mobile Internet applications. Meanwhile, access management and optimization control of application data are further provided and the utilization performance of mobile Internet is improved.

In order to make the technical solution of the disclosure clearer, detailed description will further be provided below in combination with the accompanying drawings.

Figure 1:
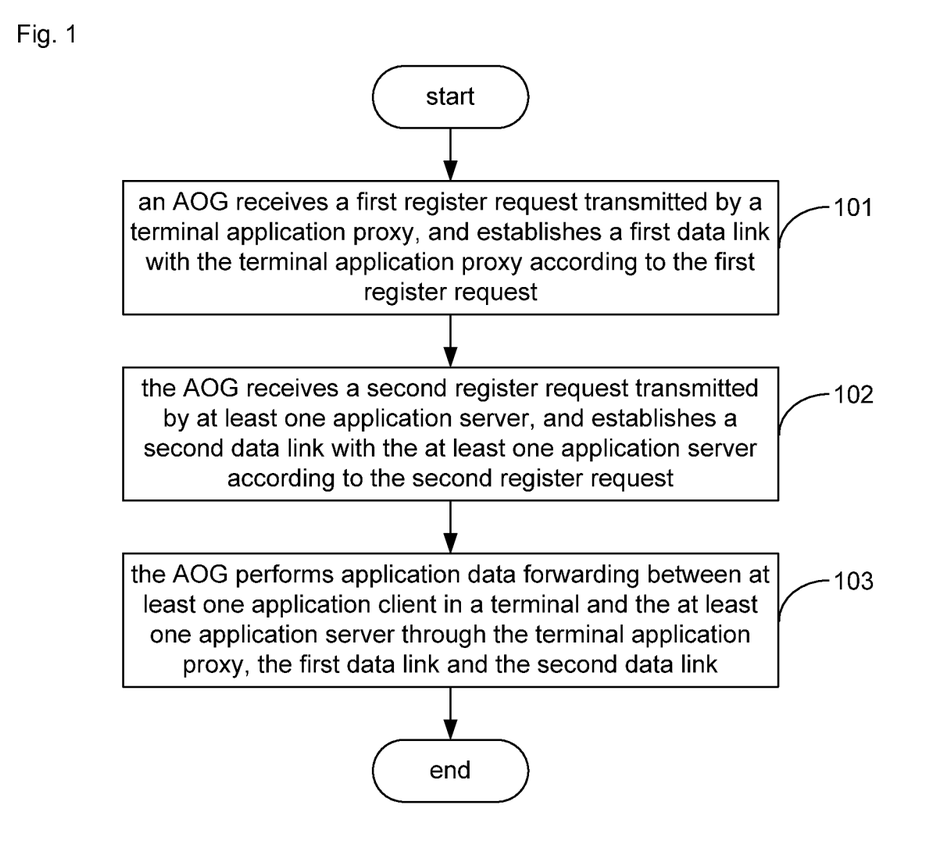
FIG. 1 is a flowchart of an embodiment of a method for implementing mobile Internet services based on an AOG according to the disclosure.

As shown in FIG. 1, an embodiment of the disclosure provides a method for implementing mobile Internet services based on an AOG, which includes the following steps.

Step 101: the AOG receives a first register request transmitted by a terminal application proxy, and establishes a first data link with the terminal application proxy according to the first register request.

In the method, the terminal application proxy is configured to perform application data forwarding between at least one application client on the terminal and the AOG.

Step 102: the AOG receives a second register request transmitted by at least one application server, and establishes a second data link with the at least one application server according to the second register request.

The operation scenario of the method in this embodiment involves the mobile Internet. In this embodiment, an Always Online Infrastructure (AOI) system accessed and controlled in a unified manner is added in the mobile Internet, and convergence and concentrated processing control of the number of connections between the terminal and the application servers are implemented through the AOI system.

The AOI system includes: an AOG middleware, i.e. the terminal application proxy, the AOG and an Always Online Gateway Domain Name System (AOG DNS) in this embodiment.

The terminal application proxy is a universal software module preset on a smart terminal, e.g. a mobile phone, and may be installed on the smart terminal as a program. In addition, the program is ensured to run in the background automatically each time when the smart terminal is started. The terminal application proxy mainly provides a control and management function for an application on the smart terminal, e.g. managing application client register on the smart terminal, establishment of connection to the AOG, and message forwarding between a terminal application client and the AOG, etc. The AOG is a function entity running on the mobile Internet. The AOG provides accesses through two sides, i.e., access to a smart terminal with a terminal application proxy installed therein and access to an application server. In addition, application data forwarding and control between the two access entities are provided. The AOG employs a dedicated Always Online Protocol (AOP) to forward the application data. The protocol is defined over the network layer and specifies a method for processing and forwarding uplink and downlink messages of an application. However, the protocol itself cannot change the content of the application data.

The AOG DNS is configured to provide a domain name access service for the terminal application proxy and the AOG. The terminal application proxy requests the AOG DNS for obtaining an IP address of an AOG to which a terminal belongs and a service capability, and the AOG requests the AOG DNS for obtaining related properties including a terminal number, etc.

In this embodiment, the terminal is a smart terminal with terminal application proxy function software installed therein, i.e. an AOG terminal. Taking a mobile phone terminal for example, the terminal, or download application proxy may be preset on the mobile phone terminded to the mobile phone terminal, and a mobile phone operation system runs the program in the background automatically each time when the mobile phone is started. An application program client, i.e. an application client in the mobile phone terminal registers and logins to the terminal application proxy after a program is installed or started, so as to be managed by the terminal application proxy. Specifically, first, an application client program is installed on the mobile phone terminal, a register request is sent to the terminal application proxy after the application client program is installed, then the terminal application proxy returns a register message response to the application client, the terminal application proxy reports register information to the AOG, and finally, the AOG returns a register response to the terminal application proxy. In this embodiment, the software function of the terminal application proxy is implemented by the terminal.

This embodiment implements application data forwarding between all application clients in a terminal and application servers through a unified data transfer channel, by using a system consisting of a terminal application proxy, an AOG, an AOG DNS and an application server.

First, the terminal application proxy and the application server need to register to the AOG, respectively so as to establish a data link between the terminal application proxy and the AOG, and a data link between the application server and the AOG.

The terminal application proxy registers to the AOG in the following way.

The terminal sends a short messaging service (SMS) message to a SMS message center. The number of a called party is a preset AOG DNS access number and the content of the SMS message is an International Mobile Subscriber Identification Number (IMSI) of the terminal. Subsequently, the SMS message center forwards the SMS message to a SMS message gateway which forwards the SMS message to the AOG DNS. The AOG DNS records a corresponding relation between the IMSI number and a calling terminal number associated with the SMS message, e.g. a Mobile Subscriber International Integrated Services Data Digital Network (ISDN) Number (MSISDN).

Subsequently, the terminal application proxy transmits a register message which carries the IMSI number of the terminal to the AOG DNS; after receiving the register message transmitted by the terminal application proxy, the AOG DNS transmits a register response message, which carries information including an IP address and a port number of an AOG to which a terminal user belongs. to the terminal application proxy.

Then, the terminal application proxy transmits a first register request to the AOG. The first register request carries information of the IP address and the port number of the AOG to which the terminal user belongs, so that the AOG can perform authentication, registration and login, etc. to the terminal application proxy according to the first register request transmitted by the terminal application proxy.

Similarly, the AOG receives a second register request transmitted by the application server so as to perform authentication, registration and login, etc. to the application server.

In this embodiment, after receiving the first register request transmitted by the terminal application proxy, the AOG performs the authentication to the terminal identity according to information including the IP address and the port number of the AOG to which the terminal user belongs. in the first register request. If the authentication is successful, the first register request is checked in. After the request is checked in successfully, a data link is established between the terminal application proxy and the AOG, referred to as a first data link in this embodiment. The first data link will function as an application common link for all application clients in the terminal. After the request is checked in successfully, the AOG further requests the AOG DNS for a terminal number. If a certain application client in the terminal needs to transmit application data to the application server subsequently, a connection does not need to be established with the application server separately and it only needs to transmit the application data which needs to be transmitted to the AOG by the terminal application proxy through the first data link, and the AOG forwards the application data to the corresponding server through a second data link between the application server and the AOG.

When the AOG establishes the second data link between the AOG and the application server, the AOG performs authentication to the second register request transmitted by the application server similarly, to determine whether a user name or a password provided by the application server is correct, for example. If the authentication is successful, the second data link between the AOG and the application server is established. There may be one, two or more second data links, each functioning as a common link between corresponding application clients on all the terminals and the application server.

Step 103: the AOG performs application data forwarding between at least one application client in the terminal and the at least one application server, through the terminal application proxy, the first data link and the second data link.

In this embodiment, when application data in an application client in the terminal needs to be transmitted to a corresponding application server, the terminal application proxy performs AOP encapsulation for the application data of the application client firstly to form an AOP message, referred to as a first application data packet in this embodiment. The first application data packet includes information including the IMSI number of the terminal and an application ID. After the encapsulation is finished, the terminal application proxy transmits the first application data packet in the AOP message to the AOG through the first data link.

After receiving the AOP message transmitted by the terminal application proxy, the AOG performs authentication first, e.g. based on a subscription relation, the AOG determines whether the terminal application proxy is authorized to transmit a message to the application client. If the authentication is passed, the AOG performs routing according to the application ID in the header of the AOP message, and after finding the corresponding application server, selects one of the second data links established between the application server and the AOG, and then transmits the AOP message to the corresponding application server through the link.

After receiving the AOP message, the application server parses the first application data packet in the AOP message, extracts the application data therein, and can perform subsequent processing according to corresponding service processes subsequently.

Similarly, when the application server needs to transmit application data to the terminal application client, the application server performs AOP encapsulation for the application data to form a second application data packet, selects one of the second data links established with the AOG, and then transmits the second application data packet in an AOP message to the AOG. The AOP message carries information including a terminal number and an application ID.

After receiving the AOP message transmitted by the application server, the AOG performs authentication to the AOP message first according to information including the terminal number pre-obtained from the AOG DNS and determines whether the application server is authorized to deliver the application data to the terminal application proxy. If the authentication is passed, the AOG finds through the terminal number the first data link established between the terminal application proxy and the AOG, and delivers the AOP message to the terminal application proxy through the first data link. After receiving the AOP message transmitted by the AOG, the terminal application proxy parses the second application data packet in the AOP message, extracts the application data therein, and determines a terminal application client to which the application data is transmitted according to the application ID in the AOP message header, so as to forward the application data to the corresponding application client.

In the transmission process of the application data, a compression mechanism is applied to the application data, i.e. the application data is encapsulated and packaged. Therefore, in order to lower the network load and reduce the transmission traffic of the application data, the terminal application proxy or the application server may compress the application data and carry control information including control information indicating whether compression is performed and a compression algorithm etc. in the AOP message header.

Further, for the application data delivered by the application server, the AOG may further determine to perform processing in different levels for application data of different applications according to priorities of the applications. Application data of an application with a higher priority will be processed and forwarded preferentially; or according to different priority weights, application data of applications with different priories are processed according to their weights.

Figure 2:
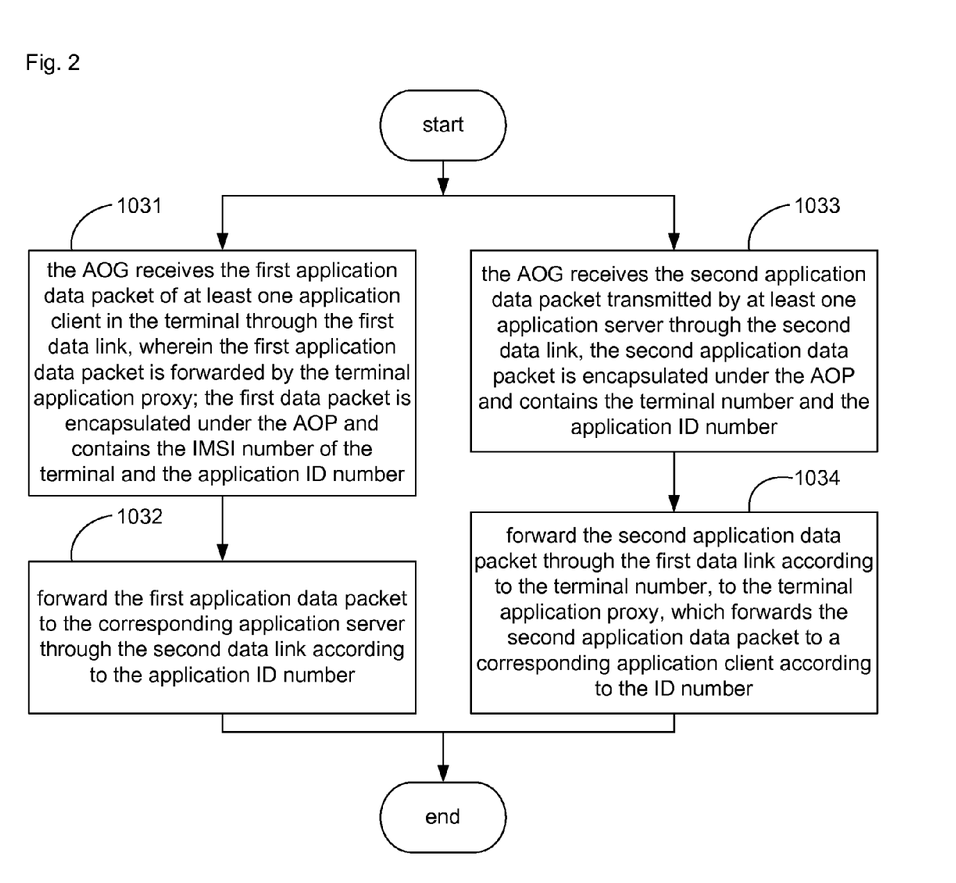
FIG. 2 is a flowchart of an embodiment in which an AOG performs application data forwarding between at least one application client in a terminal and at least one application server through a terminal application proxy, a first data link and a second data link in the embodiment of the method for implementing mobile Internet services based on the AOG according to the disclosure.

As shown in FIG. 2, Step 103 may include the following.

Step 1031: the AOG receives the first application data packet of at least one application client in the terminal through the first data link, wherein the first application data packet is forwarded by the terminal application proxy; the first data packet is encapsulated by an AOP and carries the IMSI number of the terminal and the application ID number.

Step 1302: the AOG forwards the first application data packet to the corresponding application server through the second data link according to the application ID number.

Step 1033: the AOG receives the second application data packet transmitted by at least one application server through the second data link, the second application data packet is encapsulated by an AOP and carries the terminal number and the application ID number.

Step 1034: the AOG forwards the second application data packet to the terminal application proxy through the first data link according to the terminal number, and the terminal applicant proxy forwards the second application data packet to a corresponding application client according to the ID number.

Figure 3:
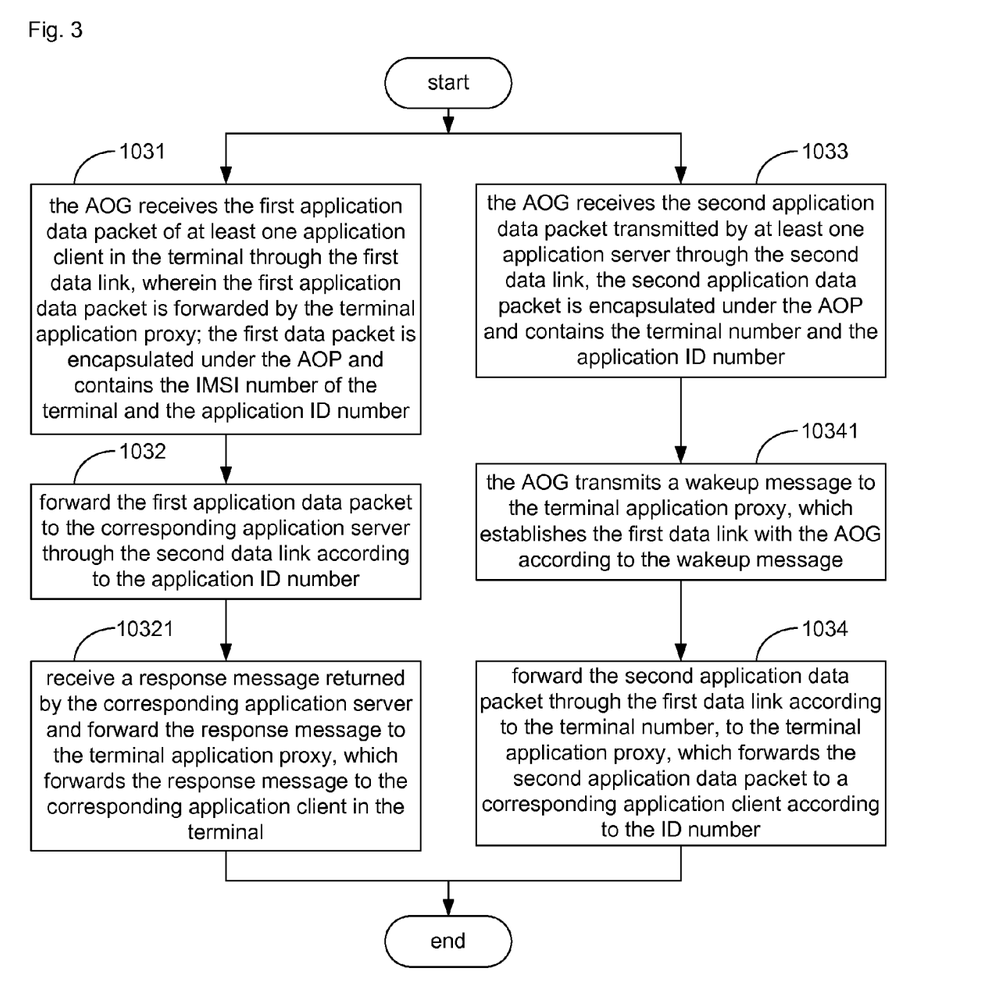
FIG. 3 is a flowchart of another embodiment in which an AOG performs application data forwarding between at least one application client in a terminal and at least one application server through a terminal application proxy, a first data link and a second data link in the embodiment of the method for implementing mobile Internet services based on the AOG according to the disclosure.

As shown in FIG. 3, in another embodiment, Step 103 may further include: after Step 1032, Step 10321: the AOG receives a response message returned by the corresponding application server and forwards the response message to the terminal application proxy; the terminal application proxy forwards the response message to the corresponding application client in the terminal.

In this step, if the application client carries a parameter in interactive information with the terminal application proxy to indicate that a final transmission result of the application packet needs to be obtained, the terminal application proxy will forward the response message returned by the application server to the application client. If the application client does not need to obtain the final transmission result of the application packet, the terminal application proxy will return the response message to the application client immediately after receiving the application data packet transmitted by the application server.

Before Step 1034, the following steps may be further performed.

Step 10341: the AOG transmits a wakeup message to the terminal application proxy, and the terminal application proxy establishes the first data link between the terminal application proxy and the AOG according to the wakeup message.

In this step, after the application server transmits the application data to the AOG, if the terminal application proxy has not established a connection to the AOG at the moment, the AOG will send the wakeup message to the terminal application proxy so that the terminal application proxy can start a designated application client program according to the content of the message. Subsequently, the terminal application proxy establishes a connection with the AOG, i.e. the first data link is established. After establishing the connection, the AOG delivers the application data to the terminal application proxy through the first data link, and the terminal application proxy forwards the application data to the corresponding application client subsequently.

It should be noted that, during the application data transmission process above, if the AOG accessed by the application server is not the same AOG accessed by the terminal application proxy, after the terminal application proxy transmits the application data to the AOG to which the terminal user belongs, the AOG to which the terminal user belongs forwards the application data to the AOG accessed by the application server. Subsequently, the AOG accessed by the application server forwards the application data to the application server.

The process in which the application server forwards the application data to the terminal application proxy through the AOG, processed may be performed according to this principle.

After Step 1304, if the application server carries a parameter in interactive information with the AOG to indicate that a final transmission result of the application packet needs to be obtained, the AOG will forward the response message returned by the terminal application proxy to the application server. If the application server does not need to obtain the final transmission result of the application packet, the AOG will return the response message to the application server immediately after receiving the application data packet transmitted by the application server.

To sum up, in the present mobile Internet, an end-to-end mode applied to establishing a service between a terminal application client and an application server side, an application server performs data interaction with a terminal application client through an end-to-end connection. If the number of terminals is M and the number of application services is N, the maximum number of available applications in a terminal is also N and the total number of connections of M terminals is as many as M*N. With the increase of the number of terminals M and the number of applications N, the number of connections M*N is increased exponentially to bring about a great impact on the mobile Internet.

This embodiment provides a unified message transfer channel and a control management mechanism between a terminal application proxy and an application server through a method based in the terminal application proxy and an AOG, and has the following characteristics: 1) multiple applications clients in a terminal may share a data link to effectively converge a large number of data links existing in the present mobile Internet. As analyzed above, if the number of terminals is M and the number of application services is N, the number of connections can be minimized to M+N by employing the method of this embodiment; 2) the reduction of the number of connections can reduce signaling loads in the mobile Internet while lowering the network data load and reducing the power consumption of terminal batteries; 3) by means of sharing the data links, a long-time online method is provided for terminals, and a message wakeup mechanism is provided so that an application server can push data to a terminal application client actively at any time; 4) multiple functions including compression, priority services, and traffic control etc. are provided to improve service experience of users more effectively; 5) an application server shares a data link with multiple terminal application clients to reduce the requirement on the connection processing capability of the application server.

Figure 4:
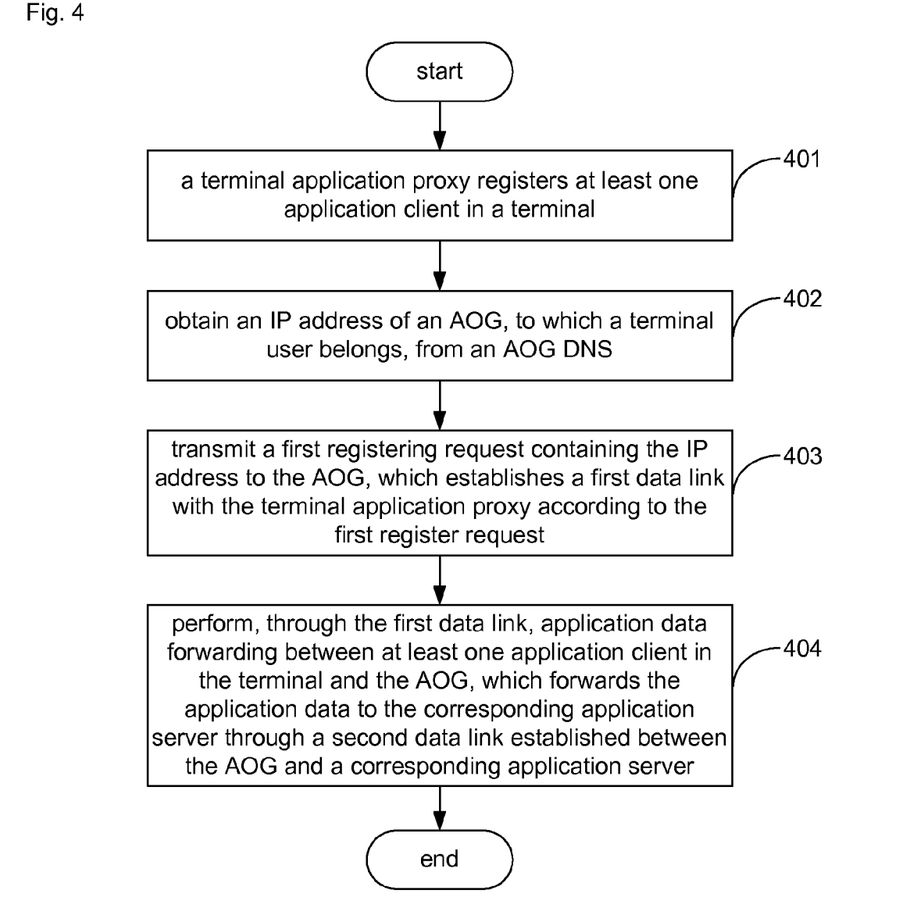
FIG. 4 is a flowchart of another embodiment of a method for implementing mobile Internet services based on an AOG according to the disclosure.

As shown in FIG. 4, another embodiment of the disclosure provides a method for implementing mobile Internet services based on an AOG, including the following steps.

Step 401: a terminal application proxy registers at least one application client in a terminal.

Step 402: the terminal application proxy obtains an IP address of an AOG, to which a terminal user belongs, from an AOG DNS;

Step 403: the terminal application proxy transmits a first registering request containing the IP address to the AOG, and the AOG establishes a first data link with the terminal application proxy according to the first register request.

Step 404: the terminal application proxy performs application data forwarding between at least one application client in the terminal and the AOG through the first data link, and the AOG forwards, through a second data link established between the AOG and a corresponding application server, the application data to the corresponding application server.

Figure 5:
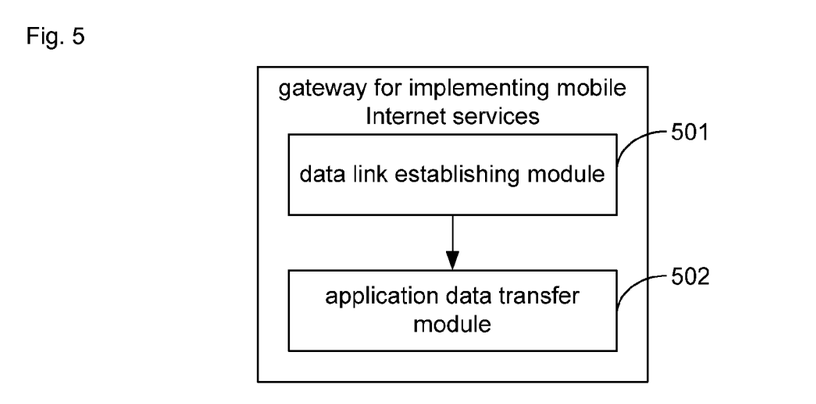
FIG. 5 is a structural diagram of an embodiment of a gateway for mobile Internet services according to the disclosure.

As shown in FIG. 5, an embodiment of the disclosure provides a gateway for mobile Internet services, including: a data link establishing module 501 and an application data transfer module 502.

The data link establishing module 501 is configured to receive a first register request transmitted by a terminal application proxy, and establish a first data link with the terminal application proxy according to the first register request; wherein the terminal application proxy is configured to perform application data forwarding between at least one application client in a terminal and the gateway, to receive a second register request transmitted by at least one application server, and to establish a second data link with the at least one application server according to the second register request.

The gateway in this embodiment is an AOG. This embodiment implements application data forwarding between each application client in a terminal and an application server through a unified data transfer channel by using a system consisting of a terminal application proxy, an AOG, an AOG DNS and an application server.

First, the terminal application proxy and the application server need to register to the AOG respectively, to establish a data link between the terminal application proxy and the AOG and a data link between the application server and the AOG.

The terminal application proxy registers to the AOG in the following way.

The terminal sends a short messaging service (SMS) message to a SMS message center. The number of a called party is a preset AOG DNS access number and the content of the SMS message is an International Mobile Subscriber Identification Number (IMSI) of the terminal. Subsequently, the SMS message center forwards the SMS message to a SMS message gateway which forwards the SMS message to the AOG DNS. The AOG DNS records a corresponding relation between the IMSI number and a calling terminal number associated with the SMS message, e.g. a Mobile Subscriber International Integrated Services Data Digital Network (ISDN) Number (MSISDN).

Subsequently, the terminal application proxy transmits a register message which carries the IMSI number of the terminal to the AOG DNS; after receiving the register message transmitted by the terminal application proxy, the AOG DNS transmits a register response message, which carries information including an IP address and a port number of an AOG to which a terminal user belongs, to the terminal application proxy.

Then, the terminal application proxy transmits a first register request to the AOG. The first register request carries information of the IP address and the port number of the AOG to which the terminal user belongs, so that the AOG can perform authentication, registration and login, etc. to the terminal application proxy according to the first register request transmitted by the terminal application proxy.

Similarly, the AOG receives a second register request transmitted by the application server so as to perform authentication, registration and login, etc. to the application server.

In this embodiment, after receiving the first register request transmitted by the terminal application proxy, the AOG performs the authentication to the terminal identity according to information including the IP address and the port number of the AOG to which the terminal user belongs. in the first register request. If the authentication is successful, the first register request is checked in. After the request is checked in successfully, a data link is established between the terminal application proxy and the AOG, referred to as a first data link in this embodiment. The first data link will function as an application common link for all application clients in the terminal. After the request is checked in successfully, the AOG further requests the AOG DNS for a terminal number. If a certain application client in the terminal needs to transmit application data to the application server subsequently, a connection does not need to be established with the application server separately and it only needs to transmit the application data which needs to be transmitted to the AOG by the terminal application proxy through the first data link, and the AOG forwards the application data to the corresponding server through a second data link between the application server and the AOG.

When the AOG establishes the second data link between the AOG and the application server, the AOG performs authentication to the second register request transmitted by the application server similarly, to determine whether a user name or a password provided by the application server is correct, for example. If the authentication is successful, the second data link between the AOG and the application server is established. There may be one, two or more second data links, each functioning as a common link between corresponding application clients on all the terminals and the application server.

The application data transfer module 502 is configured to perform application data forwarding between at least one application client in the terminal and the at least one application server, through the terminal application proxy, the first data link and the second data link.

In this embodiment, when application data in an application client in the terminal needs to be transmitted to a corresponding application server, the terminal application proxy performs AOP encapsulation for the application data of the application client firstly to form an AOP message, referred to as a first application data packet in this embodiment. The first application data packet includes information including the IMSI number of the terminal and an application ID. After the encapsulation is finished, the terminal application proxy transmits the first application data packet in the AOP message to the AOG through the first data link.

After receiving the AOP message transmitted by the terminal application proxy, the AOG performs authentication first, e.g. based on a subscription relation, the AOG determines whether the terminal application proxy is authorized to transmit a message to the application client. If the authentication is passed, the AOG performs routing according to the application ID in the header of the AOP message, and after finding the corresponding application server, selects one of the second data links established between the application server and the AOG, and then transmits the AOP message to the corresponding application server through the link.

After receiving the AOP message, the application server parses the first application data packet in the AOP message, extracts the application data therein, and can perform subsequent processing according to corresponding service processes subsequently.

Similarly, when the application server needs to transmit application data to the terminal application client, the application server performs AOP encapsulation for the application data to form a second application data packet, selects one of the second data links established with the AOG, and then transmits the second application data packet in an AOP message to the AOG. The AOP message carries information including a terminal number and an application ID.

After receiving the AOP message transmitted by the application server, the AOG performs authentication to the AOP message first according to information including the terminal number pre-obtained from the AOG DNS and determines whether the application server is authorized to deliver the application data to the terminal application proxy. If the authentication is passed, the AOG finds through the terminal number the first data link established between the terminal application proxy and the AOG, and delivers the AOP message to the terminal application proxy through the first data link. After receiving the AOP message transmitted by the AOG, the terminal application proxy parses the second application data packet in the AOP message, extracts the application data therein, and determines a terminal application client to which the application data is transmitted according to the application ID in the AOP message header, so as to forward the application data to the corresponding application client.

In the transmission process of the application data, a compression mechanism is applied to the application data, i.e. the application data is encapsulated and packaged. Therefore, in order to lower the network load and reduce the transmission traffic of the application data, the terminal application proxy or the application server may compress the application data and carry control information including control information indicating whether compression is performed and a compression algorithm etc. in the AOP message header.

Further, for the application data delivered by the application server, the AOG may further determine to perform processing in different levels for application data of different applications according to priorities of the applications. Application data of an application with a higher priority will be processed and forwarded preferentially; or according to different priority weights, application data of applications with different priories are processed according to their weights.

Figure 6:
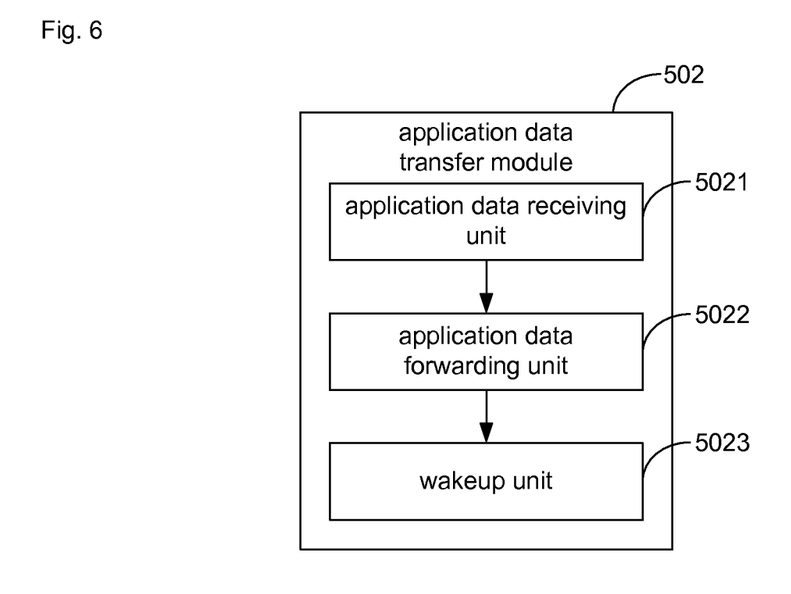
FIG. 6 is a structural diagram of an application data transfer module in the embodiment of the gateway for mobile Internet services according to the disclosure.

As shown in FIG. 6, the application data transfer module 502 includes an application data receiving unit 5021 and an application data forwarding unit 5022.

The application data receiving unit 5021 is configured to receive a first application data packet of at least one application client in the terminal through the first data link, wherein the first application data packet is forwarded by the terminal application proxy and the first application data packet is encapsulated under the AOP, and contains an IMSI number of the terminal and an ID number.

The application data forwarding unit 5022 is configured to forward the first application data packet to a corresponding application server through the second data link according to the ID number.

Further, the application data transfer module 502 further includes a wakeup unit 5023 configured, before the application data forwarding unit 5022 forwards the second application data packet to the terminal application proxy through the first data link according to the ID number, to transmit a wakeup message to the terminal application proxy, which establishes the first data link with the AOG according to the wakeup message.

Further, the application data receiving unit 5021 is further configured to receive a second application data packet transmitted by the at least one application server through the second data link; the second application data packet is encapsulated under the AOP and contains a an IMSI number of the terminal and an application ID number.

The application data forwarding unit 5022 may be further configured to forward the second application data packet through the first data link according to the terminal number, to the terminal application proxy, which forwards the second application data packet to a corresponding application client according to the ID number.

Figure 7:
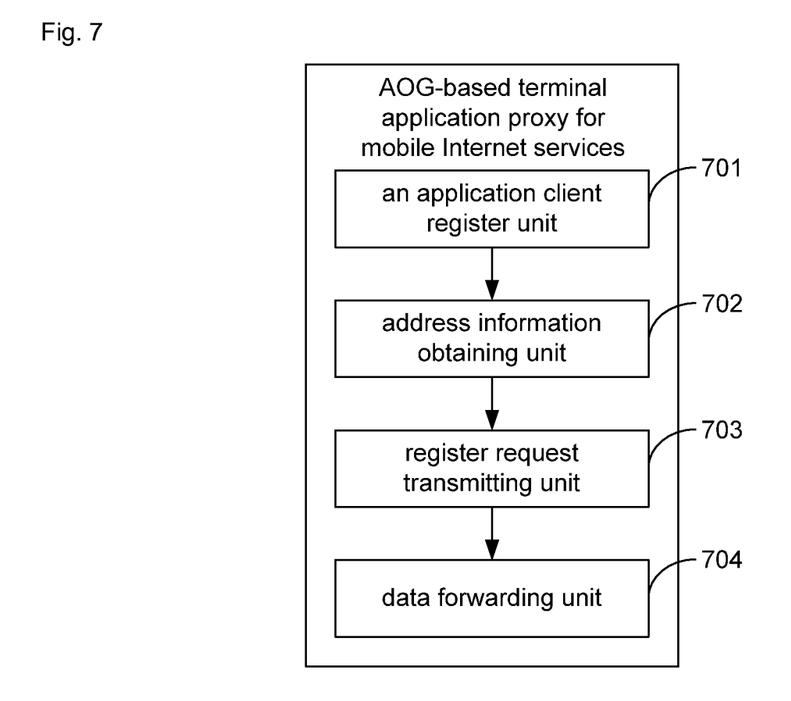
FIG. 7 is a structural diagram of an embodiment of a terminal application proxy of mobile Internet services based on an AOG according to the disclosure.

As shown in FIG. 7, an embodiment of the disclosure provides a terminal application proxy for mobile Internet services based on an AOG, including an application client register unit 701, an address information obtaining unit 702, a register request transmitting unit 703 and a data forwarding unit 704.

The application client register unit 701 is configured to register at least one application client in a terminal.

The address information obtaining unit 702 is configured to obtain an IP address of an AOG, to which a terminal user belongs, from an AOG DNS.

The register request transmitting unit 703 is configured to transmit a first register request containing the IP address to the AOG, which establishes a first data link with the terminal application proxy according to the first register request.

The data forwarding unit 704 is configured to perform, through the first data link, application data forwarding between at least one application client in the terminal and the AOG, which forwards the application data to the corresponding application server through a second data link established between the AOG and a corresponding application server.

Figure 8:
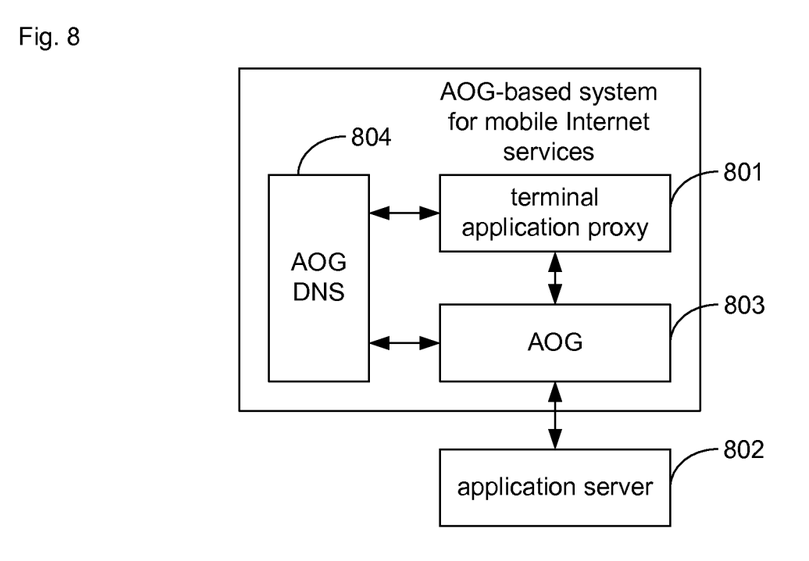
FIG. 8 is a structural diagram of an embodiment of a system of mobile Internet services based on an AOG according to the disclosure.

As shown in FIG. 8, an embodiment of the disclosure provides a system for mobile Internet services based on an AOG, including a terminal application proxy 801 and an AOG 803 connected with an application server 802.

The terminal application proxy 801 is configured to register at least one application client in a terminal; and transmit a first register request to the AOG 803.

The application server 802 is configured to transmit a second register request to the AOG 803.

The AOG 803 is configured to receive the first register request transmitted by the terminal application proxy 801, to establish a first data link with the terminal application proxy 801 according to the first register request; to receive a second register request transmitted by at least one application server 802, to establish a second data link with the at least one application server 802 according to the second register request; and to perform application data forwarding between at least one application client in the terminal and the at least one application server 802 through the terminal application proxy 801, the first data link and the second data link.

Further, the system may further include an AOG DNS 804 configured to provide a domain name access service for the terminal application proxy 801 and the AOG 803.

In this embodiment, the AOG 803 may be the gateway in the embodiments above.

In the method, gateway and system for implementing mobile Internet services according to the embodiments of the disclosure, a data link between an AOG and a terminal application proxy, and a data link between the AOG and an application server are established by arranging an AOI system between the terminal application proxy and the AOG. The AOG performs application data transfer between each application client in a terminal and the application server through the established data links. Compared with the prior art, the disclosure provides a unified data transfer channel for the terminal and the application server to converge a large number of data links existing in the present mobile Internet, reduces a large number of link detection packets existing therein, lowers the network load, reduces the consuming of network resources by the mobile Internet applications, and improves the utilization performance of mobile Internet. For an application service provider, the number of connections which need to be established by the application service provider and a terminal is reduced, and the establishment costs and difficulty of the application service provider are reduced. Access management and optimization control of application data are provided and an application with a higher priority can be processed preferentially. A data compression function is provided to reduce the amount of data transmitted by an application and lower the network load. A wakeup function of a terminal application client is provided so that the terminal application client is not started in normal times, and a terminal application program is started through a certain mechanism to perform data interaction with a server when communication needs to be performed with an application server, thus lowering the daily battery consumption of the terminal and providing a long-time online method for the application client.

The above are only the preferred embodiments of the disclosure and are not intended to limit the patent scope of the disclosure. Any equivalent structures or equivalent flow modifications made according to the description and the accompanying drawings of the disclosure, or any equivalent structures or equivalent flow modifications applied in other relevant technical fields directly or indirectly shall be included in the patent protection scope of the disclosure.

The invention claimed is:

1. A method for implementing mobile Internet services, comprising:
   receiving, by an Always Online Gateway (AOG), a first register request transmitted by a terminal application proxy, and establishing, by the AOG, a first data link with the terminal application proxy according to the first register request, wherein the terminal application proxy is configured to perform application data forwarding between at least one application client in a terminal and the AOG;
   receiving, by the AOG, a second register request transmitted by at least one application server, and establishing, by the AOG, a second data link with the at least one application server according to the second register request; and
   performing, by the AOG, application data forwarding between at least one application client in the terminal and the at least one application server, through the terminal application proxy, the first data link and the second data link,
   wherein the performing, by the AOG, application data forwarding between at least one application client in the terminal and the at least one application server, through the terminal application proxy, the first data link and the second data link comprises:
   receiving, by the AOG, a first application data packet of at least one application client in the terminal through the first data link, wherein the first application data packet is forwarded by the terminal application proxy, and the first application data packet is encapsulated under an Always Online Protocol (AOP), and contains an International Mobile Subscriber Identity (IMSI) number of the terminal and an application Identity (ID) number; and
   forwarding the first application data packet to a corresponding application server through the second data link according to the application ID number.

2. The method according to claim 1, wherein the performing, by the AOG, application data forwarding between at least one application client in the terminal and the at least one application server, through the terminal application proxy, the first data link and the second data link further comprises:
   receiving, by the AOG, a second application data packet transmitted by the at least one application server through the second data link, wherein the second application data packet is encapsulated under an Always Online Protocol (AOP) and contains a terminal number and an application ID number; and
   forwarding the second application data packet through the first data link according to the terminal number, to the terminal application proxy, which forwards the second application data packet to a corresponding application client according to the application ID number.

3. The method according to claim 2, further comprising:
   before forwarding the second application data packet through the first data link according to the terminal number, to the terminal application proxy,
   transmitting, by the AOG, a wakeup message to the terminal application proxy, which establishes the first data link with the AOG according to the wakeup message.

4. The method according to claim 3, wherein the forwarding the application data by the AOG comprises:
   forwarding, by the AOG, the application data according to a priority of the application data.

5. The method according to claim 2, wherein the forwarding the application data by the AOG comprises:
   forwarding, by the AOG, the application data according to a priority of the application data.

6. The method according to claim 1, wherein the forwarding the application data by the AOG comprises:
   forwarding, by the AOG, the application data according to a priority of the application data.

7. The method according to claim 1, wherein the forwarding the application data by the AOG comprises:
   forwarding, by the AOG, the application data according to a priority of the application data.

8. A method for implementing mobile Internet services, comprising:
   registering, by a terminal application proxy, at least one application client in a terminal;
   obtaining an Internet Protocol (IP) address of an Always Online Gateway (AOG), to which a terminal user belongs, from an AOG Domain Name System (DNS);
   transmitting a first register request containing the IP address to the AOG, which establishes a first data link with the terminal application proxy according to the first register request; and
   performing, through the first data link, application data forwarding between at least one application client in the terminal and the AOG, which forwards the application data to a corresponding application server through a second data link established between the AOG and a corresponding application server.

9. A gateway for mobile Internet services, comprising: a processor and a memory storing instructions, which are executed by the processor for:
  receiving a first register request transmitted by a terminal application proxy and establish a first data link with the terminal application proxy according to the first register request, wherein the terminal application proxy is configured to perform application data forwarding between at least one application client in a terminal and the gateway; and to receive a second register request transmitted by at least one application server and establish a second data link with the at least one application server according to the second register request; and
  performing application data forwarding between the at least one application client in the terminal and the at least one application server through the terminal application proxy, the first data link and the second data link,
  wherein the process of performing application data forwarding between the at least one application client in the terminal and the at least one application server through the terminal application proxy, the first data link and the second data link comprises:
  receiving a first application data packet of at least one application client in the terminal through the first data link, wherein the first application data packet is forwarded by the terminal application proxy, and the first application data packet is encapsulated under an Always Online Protocol (AOP), and contains an International Mobile Subscriber Identity (IMSI) number of the terminal and an application Identity (ID) number; and
  forwarding the first application data packet to a corresponding application server through the second data link according to the application ID number.

10. The gateway according to claim 9,
  wherein the process of receiving a first application data packet of at least one application client in the terminal through the first data link is further, through the second data link, receiving a second application data packet transmitted by the at least one application server, the second application data packet is encapsulated under the AOP and contains a terminal number and an application ID number, and
  wherein the process of forwarding the first application data packet to a corresponding application server through the second data link according to the application ID number is further forwarding the second application data packet through the first data link according to the terminal number, to the terminal application proxy, which forwards the second application data packet to a corresponding application client according to the application ID number.

11. The gateway according to claim 10, wherein the process of performing application data forwarding between the at least one application client in the terminal and the at least one application server through the terminal application proxy, the first data link and the second data link further comprises:
  before an application data forwarding unit forwards the second application data packet to the terminal application proxy through the first data link according to the terminal number, transmitting a wakeup message to the terminal application proxy, which establishes the first data link with the gateway according to the wakeup message.

12. The gateway according to claim 9, wherein the process of performing application data forwarding between the at least one application client in the terminal and the at least one application server through the terminal application proxy, the first data link and the second data link further comprises:
  before an application data forwarding unit forwards the second application data packet to the terminal application proxy through the first data link according to the terminal number, transmitting a wakeup message to the terminal application proxy, which establishes the first data link with the gateway according to the wakeup message.

13. A terminal comprising: a processor and a storage medium for storing instructions, which are executed by the processor for implementing a terminal application proxy of mobile Internet services, the terminal application proxy is used for:
  registering at least one application client in a terminal;
  obtaining an IP address of an AOG, to which a terminal user belongs, from an AOG DNS;
  transmitting a first register request containing the IP address to the AOG, which establishes a first data link with the terminal application proxy according to the first register request; and
  performing, through the first data link, application data forwarding between at least one application client in the terminal and the AOG, which forwards the application data to a corresponding application server through a second data link established between the AOG and a corresponding application server.

14. A system for mobile Internet services, comprising: a terminal application proxy and an Always Online Gateway (AOG),
  wherein the terminal application proxy is configured to register at least one application client in a terminal and to transmit a first register request to the AOG, and
  wherein the AOG is configured to receive the first register request transmitted by the terminal application proxy and establish a first data link with the terminal application proxy according to the first register request; to receive a second register request transmitted by at least one application server and establish a second data link with the at least one application server according to the second register request; and to perform application data forwarding between the at least one application client in the terminal and the at least one application server through the terminal application proxy, the first data link and the second data link,
  wherein the system further comprises: an AOG Domain Name System (DNS), configured to provide an Internet Protocol (IP) address of an AOG, to which a terminal user belongs, to the terminal application proxy.

* * * * *